United States Patent
Watanabe (10) Patent No.: US 10,609,247 B2
(45) Date of Patent: Mar. 31, 2020

(54) INFORMATION PROCESSING SYSTEM AND IMAGE FORMING APPARATUS THAT RECORD COMMUNICATION SOUND DATA

(71) Applicant: Konica Minolta, Inc., Tokyo (JP)

(72) Inventor: Yukio Watanabe, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/910,742

(22) Filed: Mar. 2, 2018

(65) Prior Publication Data

US 2018/0255199 A1 Sep. 6, 2018

(30) Foreign Application Priority Data

Mar. 6, 2017 (JP) ................................. 2017-041562

(51) Int. Cl.
| | |
|---|---|
| *H04N 1/32* | (2006.01) |
| *H04M 11/06* | (2006.01) |
| *H04N 1/00* | (2006.01) |
| *H04M 1/65* | (2006.01) |

(52) U.S. Cl.
CPC ...... *H04N 1/32614* (2013.01); *H04M 11/066* (2013.01); *H04N 1/00206* (2013.01); *H04M 1/65* (2013.01)

(58) Field of Classification Search
CPC ........... H04N 1/00206–00241; H04N 1/32614
USPC ....................................................... 358/468
See application file for complete search history.

(56) References Cited

U.S. PATENT DOCUMENTS

| | | | | |
|---|---|---|---|---|
| 5,734,701 | A  * | 3/1998 | Kuwabara ........... | H04M 1/6505 379/100.06 |
| 6,154,290 | A  * | 11/2000 | Makita ............... | H04N 1/32005 358/440 |
| 2002/0054341 | A1* | 5/2002 | Suzuki ............... | H04N 1/00912 358/1.15 |
| 2005/0286072 | A1* | 12/2005 | Norris ............... | H04N 1/32704 358/1.15 |
| 2007/0036276 | A1* | 2/2007 | Tanimoto ............. | H04M 1/24 379/1.01 |
| 2007/0079346 | A1* | 4/2007 | Yanagi ............... | G06F 16/93 725/112 |
| 2008/0043938 | A1* | 2/2008 | Yasuda ............... | H04M 1/6505 379/88.08 |

(Continued)

FOREIGN PATENT DOCUMENTS

JP H08-317173 A 11/1996

*Primary Examiner* — Nicholas Pachol
(74) *Attorney, Agent, or Firm* — Osha Liang LLP (57) ABSTRACT

An information processing system transmits and receives sound data through a switching equipment. The information processing system includes: a transmitting end image forming apparatus that has a facsimile function to transmit communication sounds through the switching equipment; a receiving end image forming apparatus that has a facsimile function to receive the communication sounds through the switching equipment; a controller that generates a sound recording start command to start a recording of the communication sounds, and transmits the sound recording start command to the receiving end image forming apparatus; and a sound recorder that starts the recording of the communication sounds in the receiving end image forming apparatus when the receiving end image forming apparatus receives the sound recording start command.

20 Claims, 6 Drawing Sheets

(56) References Cited

U.S. PATENT DOCUMENTS

2012/0200898 A1\* 8/2012 Roantree .............. H04N 1/0001
358/406

\* cited by examiner

INFORMATION PROCESSING SYSTEM AND IMAGE FORMING APPARATUS THAT RECORD COMMUNICATION SOUND DATA

CROSS-REFERENCE TO RELATED APPLICATIONS

The entire disclosure of Japanese Patent Application No. 2017-041562 filed on Mar. 6, 2017 is incorporated herein by reference in its entirely.

BACKGROUND

Technological Field

The present invention relates to an information processing system and an image forming apparatus.

Description of the Related Art

Conventionally, communication errors due to line failure have increased during facsimile communication using an IP telephone network, i.e., VoIP (Voice Over Internet Protocol). This type of communication errors is caused when signals are processed by a switching equipment in the middle of a communication pathway between the call transmitting end and the call reception end. It is thereby difficult to identify the cause of communication errors by analyzing T.30 commands or the like only with reference to a protocol trace list. In the present circumstances, the cause of communication errors has been identified by going to the place where communication equipment such as a facsimile is installed to record communication sounds. Incidentally, it has been proposed to record communication sounds during facsimile communication in a predetermined mode for the purpose of improving the labor to go to the installation place (for example, refer to Japanese Unexamined Patent Application Publication No. 1996-317173).

SUMMARY

However, in accordance with such a prior art technique as described in Japanese Unexamined Patent Application Publication No. 1996-317173, while communication sounds can be recorded during facsimile communication in a predetermined mode, it is impossible to select a particular communication sound. Unnecessary communication sounds are thereby recorded in this case.

One or more embodiments of the present invention therefore provide an information processing system in which necessary communication sound data can be recorded.

According to one or more embodiments of the present invention, an information processing system which transmits and receives sound data through a switching equipment, comprises: a transmitting end image forming apparatus in which a facsimile function is implemented to transmit communication sounds through the switching equipment; a receiving end image forming apparatus in which a facsimile function is implemented to receive the communication sounds through the switching equipment; a controller which generates a sound recording start command to start recording of the communication sounds, and transmits the sound recording start command to the receiving end image forming apparatus; and a sound recorder which starts recording of the communication sounds in the receiving end image forming apparatus when the receiving end image forming apparatus receives the sound recording start command.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, embodiments of the present invention will be described with reference to the drawings. However, the scope of the invention is not limited to the disclosed embodiments. Incidentally, as used in the detailed description of the embodiments, the terms "comprise," "consist of," "include," "including," "have," "incorporate," and any synonyms thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Furthermore, unless otherwise specifically indicated, the term "or" represents "inclusive or" but does not means "exclusive or". For example, "condition A or condition B" is true in any of the case that condition A is true and condition B is false, the case that condition A is false and condition B is true, and the case that condition A is true and condition B is true.

One or more embodiments of the present invention are related also to the apparatus that performs processing as described herein. Such an apparatus may specifically be built for the intended purpose, or may be built as a general purpose computer which is selectively activated or reconfigured by a computer program stored in the computer.

Also, the algorithm as explained here does not require a particular computer or apparatus. Various general purpose systems can be used together with a program which is designed in accordance with this description. Alternatively, it may be understood that a particular apparatus dedicated to perform necessary method steps can be conveniently used. The structure required for these various systems will be apparent from the following explanation. Furthermore, the one or more embodiments of the present invention do not depend on any particular programming language. It will be understood that various programming languages can be used to realize the technique described here.

Figure 1:
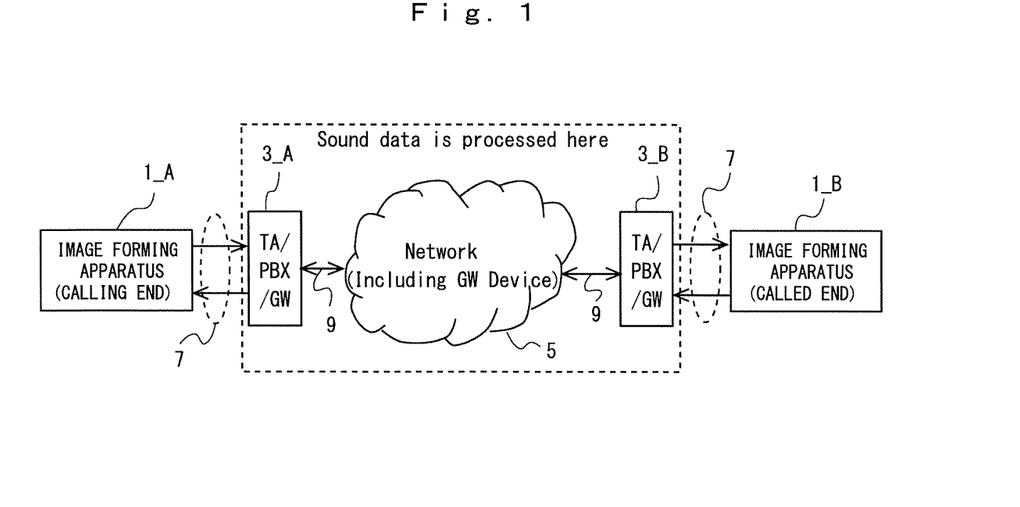
FIG. 1 is a schematic view for showing an example of the overall configuration of an information processing system according to one or more embodiments of the present invention.

FIG. 1 is a schematic view for showing an example of the overall configuration of an information processing system according to one or more embodiments of the present invention. As shown in FIG. 1, this system includes an image forming apparatus 1_A, an image forming apparatus 1_B, a switching equipment 3_A and a switching equipment 3_B. The switching equipment 3_A and the switching equipment 3_B are connected through a network 5. The image forming apparatus 1_A and the image forming apparatus 1_B can exchange various data including communication sound data through the switching equipment 3_A, the network 5 and the switching equipment 3_B, and can perform sound processing functions such as a facsimile function, a voice reproduction function and a voice recording function. Incidentally, the image forming apparatus 1_A and the image forming apparatus 1_B are collectively referred to simply as the image forming apparatus 1 when they need not be distinguished. Also, the switching equipment 3_A and the switching equipment 3_B are collectively referred to simply as the switching equipment 3 when they need not be distinguished. Furthermore, the network 5 may be an IP network or a telephone line network, i.e., specifically, PSTN (Public Switched Telephone Network).

Incidentally, the image forming apparatus 1_A serves as a transmitting end apparatus, i.e., a transmission side image forming apparatus in which a facsimile function is implemented to transmit communication sounds through the switching equipment 3_A. On the other hand, the image forming apparatus 1_B serves as a receiving end apparatus, i.e., a receiving end image forming apparatus in which a facsimile function is implemented to receive communication sounds through the switching equipment 3_B. Namely, the information processing system including the image forming apparatus 1_A, the image forming apparatus 1_B, the switching equipment 3_A and the switching equipment 3_B transmits and receives sound data through the switching equipment 3_A and the switching equipment 3_B. The sound data means data which is transmitted and received through VoIP communication or a public switched telephone network. Also, communication sound data means data which is generated by encoding communication sounds and transmitted and received between the image forming apparatus 1_A and the image forming apparatus 1_B. Communication sounds are transmitted and received between the image forming apparatus 1_A and the image forming apparatus 1_B through the switching equipment 3_A and the switching equipment 3_B. The switching equipment 3 transmits and receives communication sounds through the network 5, i.e., an IP network or a public switched telephone network. Accordingly, the term "communication sound data" is used herein to include also voice data.

Figure 2:
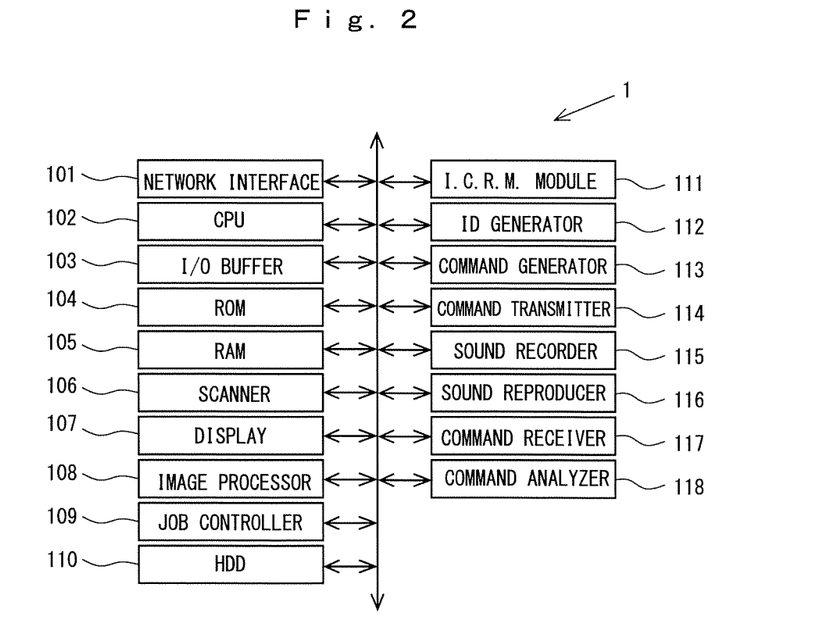
FIG. 2 is a block diagram for showing an image forming apparatus 1 according to one or more embodiments of the present invention.

FIG. 2 is a block diagram for showing the image forming apparatus 1. As shown in FIG. 2, the image forming apparatus 1 includes a network interface 101, a CPU 102, an input/output buffer 103, a ROM 104, a RAM 105, a scanner 106, a display 107, an image processor 108, a job controller 109, an HDD 110, an incoming call response monitoring module 111, an ID generator 112, a command generator 113, a command transmitter 114, a sound recorder 115, a sound reproducer 116, a command receiver 117, a command analyzer 118 and the like for implementing the sound processing functions.

The network interface 101 performs various protocol conversion. The CPU 102 integrally controls the image forming apparatus 1 by loading a variety of modules stored in the ROM 104 and the HDD 110 on the RAM 105 and running the modules. The input/output buffer 103 temporarily stores various data to perform communication with the various data between the image forming apparatus 1 and the switching equipment 3. The input/output buffer 103 temporarily accumulates packets containing communication sound data, for example, as transmitted from the transmitting end. The scanner 106 captures various images, characters or the like printed on recording mediums. The display 107 outputs and displays various information to users. The image processor 108 forms an image on a recording medium by an electrophotographic system or the like. The job controller 109 manages and controls a variety of jobs. For example, the job controller 109 controls the incoming call response monitoring module 111, the ID generator 112, the command generator 113, the command transmitter 114, the sound recorder 115, the sound reproducer 116, the command receiver 117 and the command analyzer 118. Also, the HDD 110 serves as a storage which stores, for example, recorded sound data prepared by recording communication sounds.

The incoming call response monitoring module 111 detects the off-hook of the image forming apparatus 1 at the call reception end. The incoming call response monitoring module 111 monitors an incoming call response by, for example, monitoring voltage variation of a telephone line 7 through which the image forming apparatus 1 and the switching equipment 3 are connected, detecting polarity inversion on the telephone line 7 or monitoring the network protocol on a communication line 9 through which the network 5 and the switching equipment 3 are connected, to detect an off-hook. Specifically, under the communication environment where the switching equipment 3 transmits and receives communication sounds through an IP network, the incoming call response monitoring module 111 monitors an incoming call response on the communication line 9 through which an IP network and the switching equipment 3 are connected. The ID generator 112 associates job ID information with apparatus ID information when a sound recording start command is transmitted. A job is performed by the image forming apparatus 1. The job ID information is managed, for example, by assigning numbers to jobs respectively. The apparatus ID information is given as a device identifier which identifies particular one of a plurality of the image forming apparatuses 1. For example, the apparatus ID information identifies, from among the plurality of the image forming apparatuses 1, the image forming apparatus 1 located at least one of the communication sound data transmitting end or the communication sound data receiving end. Incidentally, in the example shown in FIG. 1, the image forming apparatus 1_A is located at the communication sound data transmitting end, and serves as a transmitting end image forming apparatus 1. Also, the image forming apparatus 1_B is located at the communication sound data receiving end, and serves as a receiving end image forming apparatus 1.

The command generator 113 generates various commands such as a sound recording start command. The sound recording start command is used to start recording of communication sound data. The command transmitter 114 transmits various commands such as a sound recording start command, for example, in the form of DTMF signals. When the incoming call response monitoring module 111 detects an incoming call response, the command transmitter 114 transmits a sound recording start command which is generated by the command generator 113.

Specifically, the command transmitter 114 transmits a sound recording start command before a calling tone, i.e., a CNG signal for communicating communication sound data is transmitted from the apparatus in the communication sound data transmission side of the plurality of the image forming apparatuses 1. The sound recording start command includes apparatus ID information for identifying the apparatus at the communication sound data transmitting end, and job ID information corresponding to the job for recording the communication sound data. The job ID information includes information for identifying a job which is managed by the apparatus at the communication sound data transmitting end of the plurality of the image forming apparatuses 1, and information for identifying a job which is managed by the apparatus at the communication sound data receiving end of the plurality of the image forming apparatuses 1. Each of the apparatus at the communication sound data transmitting end and the apparatus at the communication sound data receiving end starts recording of communication sound data by transmission of the sound recording start command, stops recording of communication sound when communication of communication sound data is completed, and stores the recorded communication sound data as recorded sound data. The recorded sound data is associated with apparatus ID information for identifying the apparatus at the communication sound data transmitting end, a job which is managed by the apparatus at the communication sound data transmitting end, and a job which is managed by the apparatus at the communication sound data receiving end. Incidentally, the recorded sound data is deleted when a predetermined time elapses. The predetermined time is determined in accordance with the upper limit of the number of stored items of a job history, the elapsed number of days after storing a job, the elapsed time after storing a job, or the like predetermined data retention period.

The sound recorder 115 records communication sound data transmitted on the telephone line 7 with a circuit near a modular jack or a speaker circuit. When sound recording of communication sound data is finished, the sound recorder 115 stores the recorded sound data prepared by recording communication sound data in association with job ID information and apparatus ID information. Namely, the sound recorder 115 is a device for storing recorded sound data prepared by recording communication sounds in the HDD 110. The sound reproducer 116 reproduces the recorded sound data of communication sound data digitized by the sound recorder 115 as analog sounds. The command receiver 117 receives various commands from the communication partner. Incidentally, the command receiver 117 may be implemented as another circuit which is provided separate from a usual circuit for facsimile communication. The command analyzer 118 analyzes various received commands, and acquires the instruction content of the various commands, and various ID information such as job ID information and apparatus ID information. For example, the command analyzer 118 acquires apparatus ID information or job ID information from a sound recording start command.

Namely, the controller generates a sound recording start command to start recording of communication sounds, and transmits the sound recording start command to the image forming apparatus 1_B functioning as a receiving end image forming apparatus. Specifically, after the incoming call response monitoring module 111 detects an incoming call response, the controller transmits the sound recording start command to the image forming apparatus 1_B functioning as a receiving end image forming apparatus. Also, before the image forming apparatus 1_A functioning as a transmitting end image forming apparatus transmits a calling tone for transmitting communication sounds, the controller transmits the sound recording start command to the image forming apparatus 1_B functioning as a receiving end image forming apparatus. When the image forming apparatus 1_B functioning as a receiving end image forming apparatus receives a sound recording start command, the controller generates a command receiving result notification, and transmits the command receiving result notification to the image forming apparatus 1_A functioning as a transmitting end image forming apparatus. The command receiving result notification contains apparatus ID information identifying the image forming apparatus 1_B at the communication sound receiving end and job ID information identifying a job which corresponds to recording of communication sounds and is managed by the image forming apparatus 1_B at the communication sound receiving end.

When the image forming apparatus 1_B functioning as a receiving end image forming apparatus receives a sound recording start command, the sound recorder 115 starts recording of communication sounds in the image forming apparatus 1_B functioning as a receiving end image forming apparatus. Specifically, after the command analyzer 118 analyzes a sound recording start command, the sound recorder 115 of the image forming apparatus 1_B starts recording of communication sounds in the image forming apparatus 1_B functioning as a receiving end image forming apparatus. When the image forming apparatus 1_A functioning as a transmitting end image forming apparatus receives a command receiving result notification, the sound recorder 115 of the image forming apparatus 1_A starts recording of communication sounds in the image forming apparatus 1_A functioning as a transmitting end image forming apparatus. Also, when the transmission and reception of communication sounds is completed, recording of the communication sounds is stopped followed by storing sound data obtained by recording communication sounds as recorded sound data, for example, in the HDD 110 or the like serving as a storage. Specifically, the sound recorder 115 stores recorded sound data in the HDD 110 in association with apparatus ID information identifying the image forming apparatus 1_A functioning as a transmitting end image forming apparatus, a job which corresponds to recording of communication sounds and is managed by the image forming apparatus 1_A at the communication sound transmitting end and a job which corresponds to recording of communication sounds and is managed by the image forming apparatus 1_B functioning as a receiving end image forming apparatus. Incidentally, the sound recorder 115 deletes the recorded sound data when a predetermined time elapses.

Figure 3:
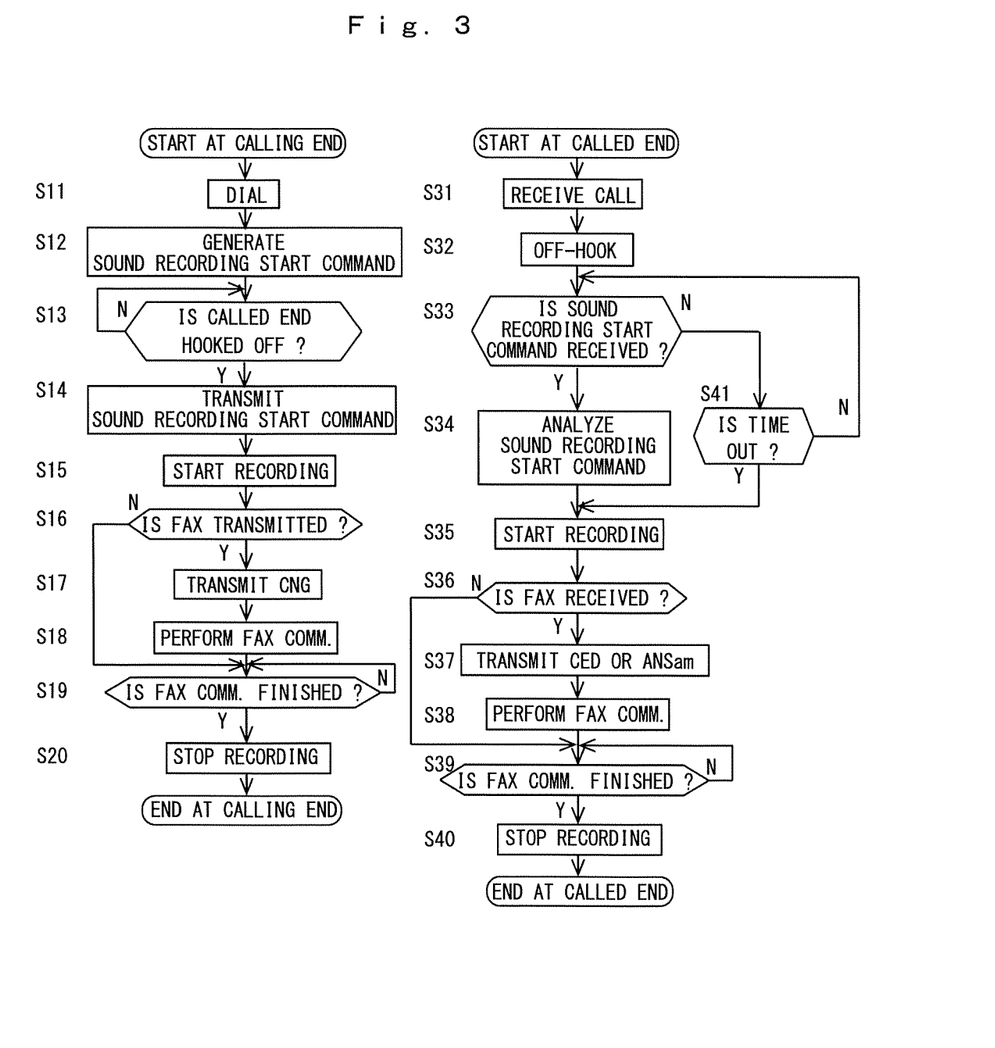
FIG. 3 is a flow chart for explaining a control example of the image forming apparatus 1 according to one or more embodiments of the present invention.

FIG. 3 is a flow chart for explaining a control example of the image forming apparatus 1. In FIG. 3, it is assumed that the processes in step S11 through step S20 are performed as processes at the calling end by the image forming apparatus 1_A, and that the processes in step S31 through step S40 are performed as processes at the called end by the image forming apparatus 1_B. Meanwhile, the calling end is the apparatus which transmits a sound recording start command, and the called end is the apparatus which receives the transmitted sound recording start command.

In step S11, the calling end dials the called end. In step S12, a sound recording start command is generated. In step S13, it is determined whether or not the called end is hooked off. If it is determined that the called end is hooked off (step S13: Y), the process proceeds to step S14. Conversely, if it is determined that the called end is not hooked off (step S13: N), step S13 is repeated. In step S14, the sound recording start command is transmitted. In step S15, recording of communication sound data is started. In step S16, it is determined whether or not facsimile is transmitted. If it is determined that facsimile is transmitted (step S16: Y), the process proceeds to step S17. Conversely, if it is determined that facsimile is not transmitted (step S16: N), the process proceeds to step S19. In step S17, a CNG signal is transmitted. In step S18, facsimile communication is performed. In step S19, it is determined whether or not facsimile communication is finished. When it is determined that facsimile communication is finished (step S19: Y), the process proceeds to step S20. Conversely, if it is determined that facsimile communication is not finished (step S19: N), step S19 is repeated. In step S20, recording of communication sound data is stopped, and the process at the calling end is finished.

In step S31, the called end is called. In step S32, the called end is hooked off. In step S33, it is determined whether or not the sound recording start command is received. If it is determined that the sound recording start command is received, (step S33: Y), the process proceeds to step S34. Conversely, if it is determined that the sound recording start command is not received, (step S33: N), the process proceeds to step S41. In step S34, the sound recording start command is analyzed. In step S35, recording of communication sound data is started. In step S36, it is determined whether or not facsimile is received. If it is determined that facsimile is received (step S36: Y), the process proceeds to step S37. Conversely, if it is determined that facsimile is not received (step S36: N), the process proceeds to step S39. In step S37, a CED signal or an ANSam signal is transmitted. In step S38, facsimile communication is performed. In step S39, it is determined whether or not facsimile communication is finished. If it is determined that facsimile communication is finished (step S39: Y), the process proceeds to step S40. Conversely, if it is determined that facsimile communication is not finished (step S39: N), step S39 is repeated. In step S40, recording of communication sound data is stopped, and the procedure at the called end is terminated. In step S41, it is determined whether or not time is out. If it is determined that time is out (step S41: Y), the process proceeds to step S35. Conversely, if it is determined that time is not out (step S41: N), the process is returned to step S33.

Meanwhile, in the case where the apparatus serves as the transmitting end of a sound recording start command, since the communication partner of this apparatus is a compatible apparatus which can accept the sound recording start command, the communication partner starts recording after receiving the sound recording start command, more specifically after analyzing the sound recording start command. On the other hand, in the case where the apparatus serves as the receiving end of a sound recording start command, since the communication partner of this apparatus is a compatible apparatus which can transmit the sound recording start command, the communication partner starts recording after receiving a command receiving result notification.

Figure 4:
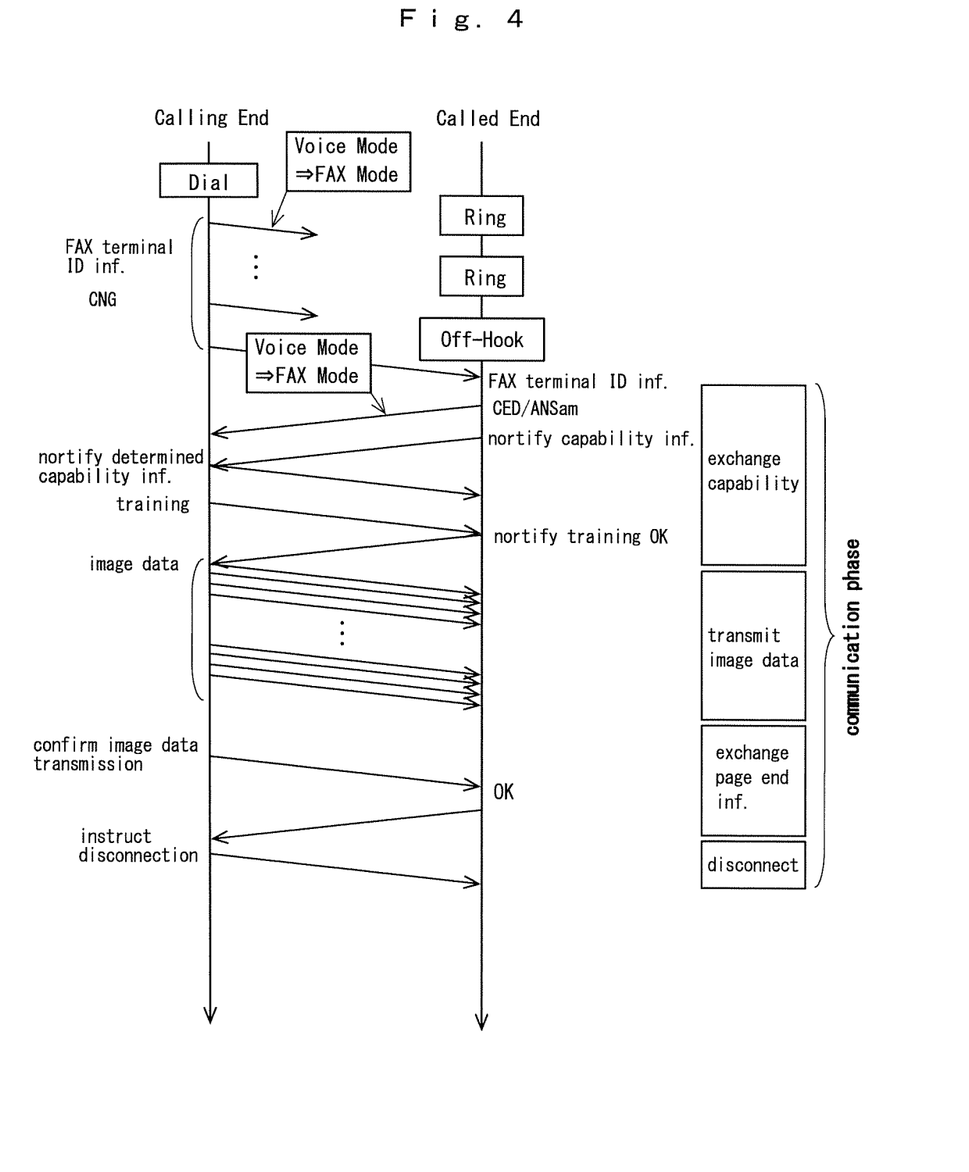
FIG. 4 shows a sequence of communicating communication sound data when no sound recording start command is transmitted according to one or more embodiments of the present invention.

FIG. 4 shows a sequence of communicating communication sound data when no sound recording start command is transmitted. The sequence shown in FIG. 4 includes communication phases, i.e., exchanging capability information, transmitting image data, exchanging page end information and disconnection. Specifically, when the apparatus at the called end is hooked off by dialing from the apparatus at the calling end, a CNG signal is transmitted from the apparatus at the calling end as a FAX terminal identification signal, and the operation mode of the image forming apparatus 1 is switched from a voice mode to a FAX mode. The apparatus at the called end then transmits a CED signal or an ANSam signal, and capability information is transmitted to the apparatus at the calling end. The capability information is contained in the DIS signal or the CSI signal. The DIS signal is used to implement the function of a digital identification signal and represent the standard capability of the called terminal. The CSI signal is used to implement the function of a called terminal identification such that the called terminal is identified by an international telephone call number. The apparatus at the calling end receives a notification of capability information and notifies the apparatus at the called end of capability determination information. The capability determination information corresponds to the DCS signal or the TSI signal. The DCS signal is used to implement the function of a digital instruction signal as a digital setting instruction in response to standard functions identified by the DIS signal. The TSI signal is used to implement the function of identifying the transmission terminal, followed by FIF information indicative of identification of the transmission terminal. Next, training is performed by the TCF signal, and if the CFR signal is transmitted, the premessage procedure is completed to confirm that message transmission can be started. Then, image data is transmitted as a message from the apparatus at the communication sound data transmitting end to the apparatus at the communication sound data receiving end. When message transmission is finished, the EOM signal and the like are transmitted. The MCF signal is then transmitted as a response, followed by transmitting the DCN signal which instructs disconnection to complete the FAX communication.

Namely, between the apparatus at the calling end and the apparatus at the called end, FAX terminal identification signals such as the CNG signal and the CED signal or the ANSam signal are exchanged, followed by exchanging an initial identification signal such as the DIS signal, a receiving instruction such as the DCS signal, a pre-message response such as the CFR signal, a message such as image data, a post message instruction such as the EOM signal, a post message response such as the MCF signal, a line control signal such as the DCN signal and the like signal. These signals are stored as recorded sound data, and signals necessary for analysis can readily be used by associating the stored recorded sound data with job ID information and apparatus ID information.

Figure 5:
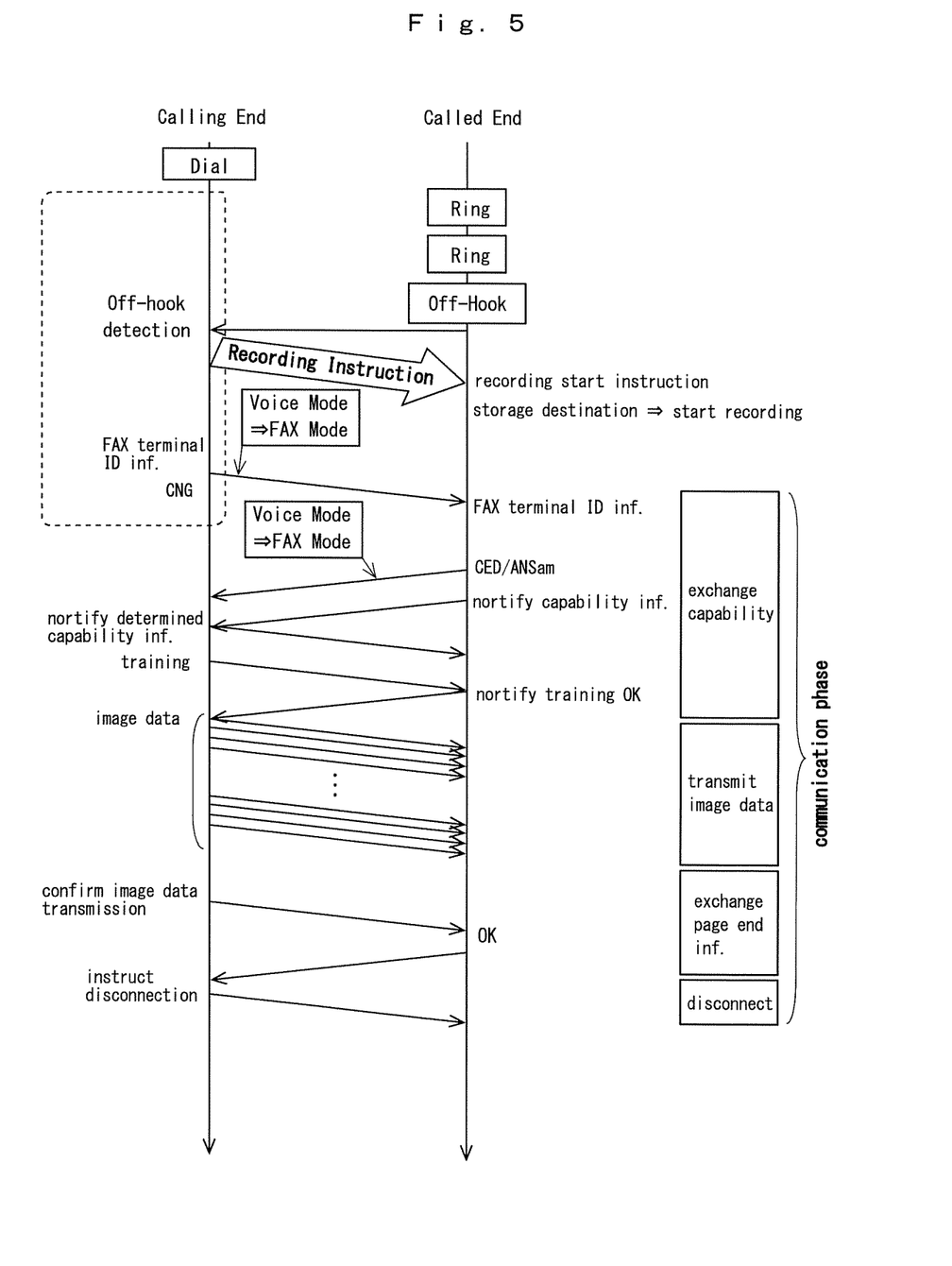
FIG. 5 shows a sequence of communicating communication sound data when a sound recording start command is transmitted according to one or more embodiments of the present invention.

FIG. 5 shows a sequence of communicating communication sound data when a sound recording start command is transmitted. The sequence shown in FIG. 5 differs from the sequence shown in FIG. 4 in that a sound recording start command is transmitted in advance of transmitting the CNG signal is transmitted after detecting an off-hook as an incoming call response. The subsequent steps in FIG. 5 are similar to the corresponding steps in FIG. 4. The sound recording start command is transmitted, for example, by the use of the DTMF signal. In other words, a sound recording start command is issued in advance of switching the operation mode of the switching equipment 3 from a voice mode to a FAX mode.

Figure 6:
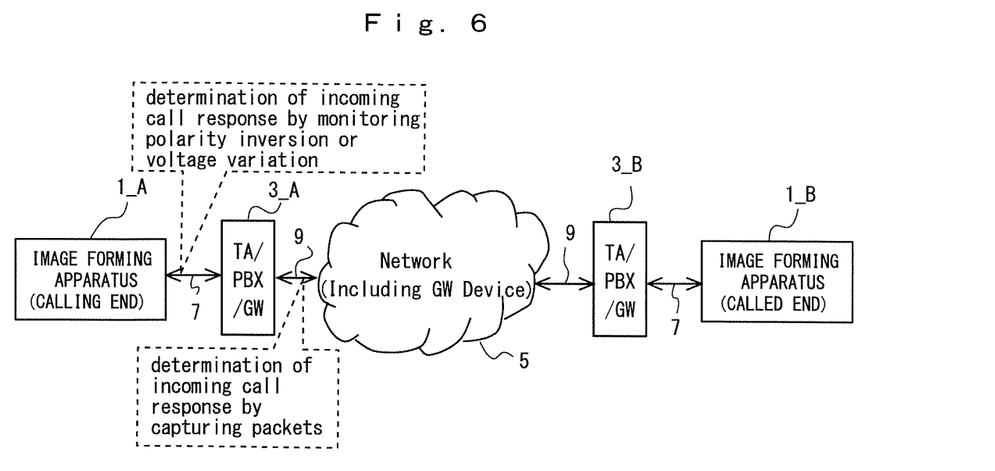
FIG. 6 is a schematic diagram for showing one example of a site where an incoming call response is determined according to one or more embodiments of the present invention.

FIG. 6 is a schematic diagram for showing one example of a site where an incoming call response is determined. As shown in FIG. 6, when an off-hook is detected by monitoring voltage variation or detecting polarity inversion, it can be performed by monitoring the telephone line 7 between the image forming apparatus 1 and the switching equipment 3. On the other hand, when an off-hook is detected by monitoring the network protocol, i.e., by capturing packets, it can be performed by monitoring the telephone line 7 between the switching equipment 3 and the network 5. Incidentally, the switching equipment 3 is a TA, a PBX or a GW device, and the network 5 includes a GW device.

Figure 7:
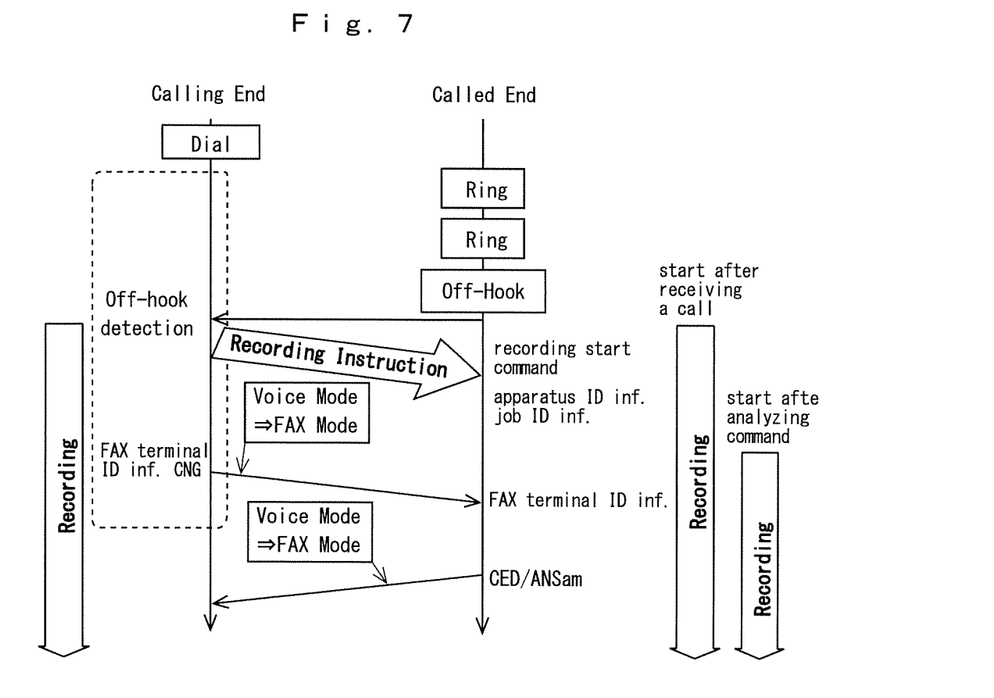
FIG. 7 shows one example of a sequence for showing the timing when recording is started by an apparatus at the called end according to one or more embodiments of the present invention.

FIG. 7 shows one example of a sequence for showing the timing when recording is started by the apparatus at the called end. The switching equipment 3 operates in a voice mode until detecting a FAX terminal identification signal such as the CNG signal. The sound recording start command is transmitted by the DTMF signal from the calling end while the operation mode of the switching equipment 3 is a voice mode. The DTMF signal is transmitted to indicate start of recording and the destination. Specifically, the destination includes apparatus ID information, job ID information and the like. Meanwhile, the DTMF signal is transmitted at −35 dBm in order that the DTMF signal cannot be heard by the ears of a person.

The apparatus at the called end analyzes the sound recording start command, and stores recorded sound data in association with the analyzed apparatus ID information and job ID information. Recording of communication sounds can be started just after receiving an incoming call, or can be started after analyzing the sound recording start command and before transmitting the CNG signal as a calling tone. When exchanging the DTMF signal is finished, the apparatus at the calling end transmits the CNG signal. The apparatus at the called end responds to the CNG signal and transmits the CED signal or the ANSam signal. The CED signal is a called station identification signal which is transmitted by the use of the characteristics of the V.21 Channel 2 modulation system, but V.34 communication cannot be used. The ANSam signal is a deformation response signal which is transmitted by the use of the characteristics of the V.34 half-duplex modulation system. The operation mode of the switching equipment 3 is switched from a voice mode to a FAX mode by detecting a FAX terminal identification signal such as the CNG signal, the CED signal or the ANSam signal. When the operation mode is switched to a FAX mode, the switching equipment 3 performs FAX communication, and the recorded sound data can be delivered after completion of the FAX communication. The delivery of the recorded sound data may be performed by uploading the data to a server which is not shown in the figure, or by exchanging the data between the image forming apparatuses 1.

Specifically, for example, the recorded sound data associated with job ID information and the apparatus ID information can be uploaded to the network 5 based on email address information which is registered in advance, URL information which is exchanged or the like. Such an uploading process can be performed after completing FAX communication on both the apparatus at the communication sound data transmitting end and the apparatus at the communication sound data receiving end. Upload destination information can be notified as URL information or the like when performing normal FAX communication or in the form of a QR code (registered trademark) printed on the first page of image data. Alternatively, the upload destination information can be notified from a separate channel known as Internet FAX or the like, also known as G3-FAX. The recorded sound data as described above can be analyzed such that FAX communication can be performed after modifying various parameters and re-dialing. A communication error can be avoided by doing so.

Meanwhile, in FIG. 7, if the communication partner, i.e., the apparatus at the communication sound transmitting end is a compatible apparatus which can transmit a sound recording start command, the communication partner starts recording after receiving a command receiving result notification. On the other hand, if the communication partner is not a compatible apparatus which can transmit a sound recording start command, the communication partner starts recording after calling, i.e., more specifically after detecting an off-hook.

Figure 8:
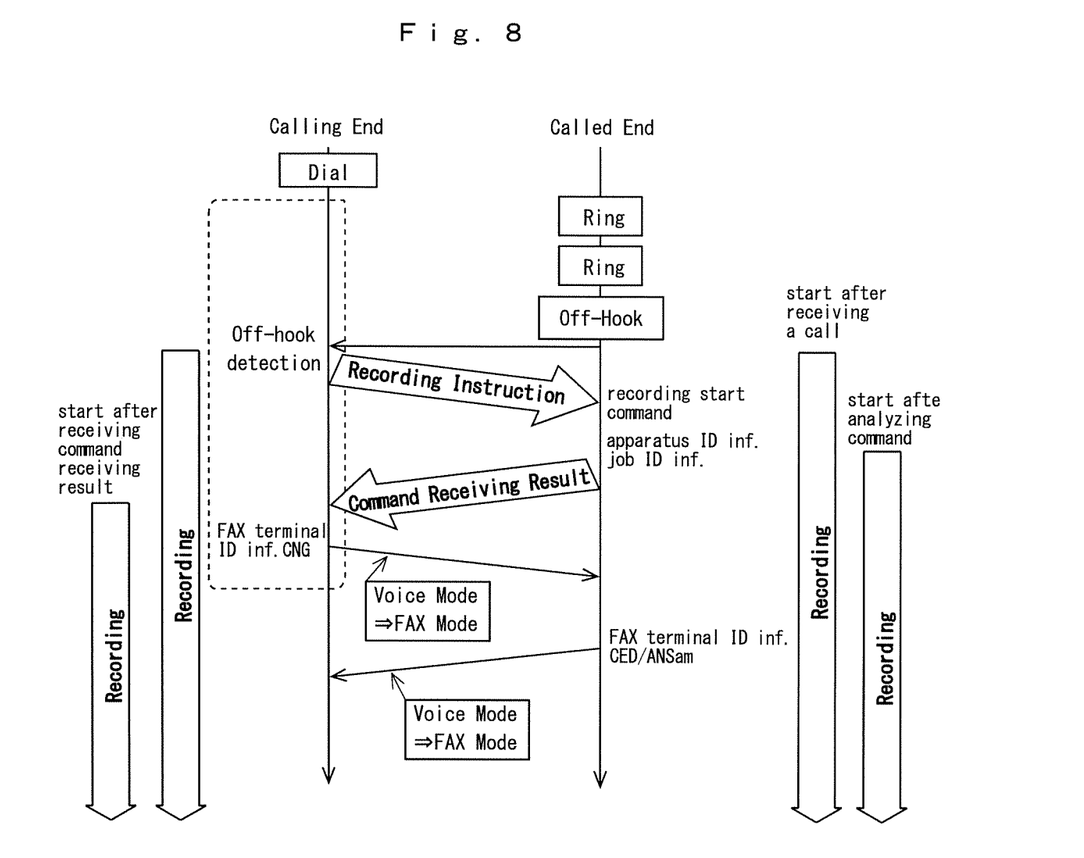
FIG. 8 shows one example of a sequence for showing the timing when recording is started by an apparatus at the calling end according to one or more embodiments of the present invention.

FIG. 8 shows one example of a sequence for showing the timing when recording is started by the apparatus at the calling end. As illustrated in the sequence of FIG. 8, the apparatus at the calling end can start recording and FAX communication before the apparatus at the calling end transmits the CNG signal as a calling tone after receiving a command reception result notification which is transmitted as the response signal of a sound recording start command.

Meanwhile, in FIG. 8, if the communication partner, i.e., the apparatus at the communication sound receiving end is a compatible apparatus which can receive a sound recording start command, the communication partner starts recording after receiving a sound recording start command, i.e., more specifically after analyzing a sound recording start command. On the other hand, if the communication partner is not a compatible apparatus which can receive a sound recording start command, the communication partner starts recording after receiving a calling tone, i.e., after off-hook.

Figure 9:
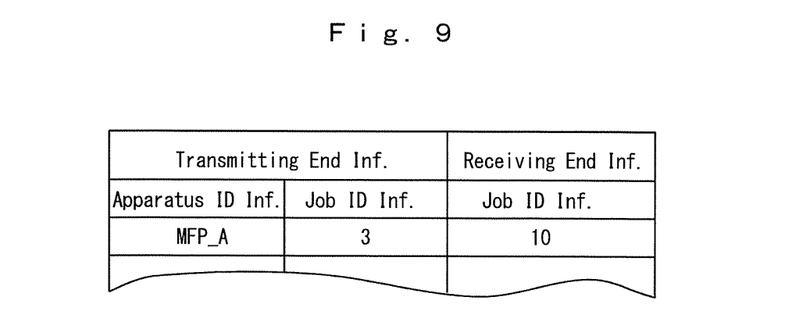
FIG. 9 shows one example of a management table of recorded sound data according to one or more embodiments of the present invention.

FIG. 9 shows one example of a management table of recorded sound data. As shown in FIG. 9, transmitting end information and receiving end information are associated with each other in the table. For example, apparatus ID information and job ID information are set as the transmitting end information of communication sound data. The apparatus ID information of the transmitting end information of communication sound data is set as an identifier such as MFP_A which indicates the image forming apparatus 1_A. The job ID information of the transmitting end information of communication sound data is set as a job number, for example, a numeral such as 3 which is managed by the image forming apparatus 1_A. The job number is not limited to a numeral as long as it can be used to identify each job. The receiving end information of communication sound data is set to, for example, job ID information. The job ID information of the receiving end information of communication sound data is set to a numeral, for example, 10 as a job number which is managed by the image forming apparatus 1_B. Like the transmitting end information of communication sound data, the job number managed by the image forming apparatus 1_B is not limited to a numeral as long as it can be used to identify each job.

As has been discussed above, in the case of the information processing system according to one or more embodiments of the present invention, a sound recording start command is transmitted, when an incoming call response is detected, for starting recording of communication sound data, so that a persistent recording situation can be avoided, and it is possible to start recording only when needed and record only necessary communication sounds.

Also, the sound recording start command can be transmitted in advance of switching the operation mode of the switching equipment 3 from a voice mode to a FAX mode by transmitting the sound recording start command in advance of transmission of a calling tone, so that recording can be started in advance of switching the operation mode to the FAX mode.

Furthermore, an incoming call response is monitored by monitoring voltage variation of a telephone line 7 through which the image forming apparatus 1 and the switching equipment 3 are connected, detecting polarity inversion on the telephone line 7 or monitoring the network protocol on a communication line 9 through which the network 5 and the switching equipment 3 are connected, so that it is possible to monitor the circuit network connecting the image forming apparatus 1 and the switching equipment 3 or the circuit network connecting the network 5 and the switching equipment 3 and thereby to monitor the site where sound data communication is involved.

Still further, the sound recording start command includes apparatus ID information for identifying the apparatus at the communication sound data transmitting end, and job ID information corresponding to the job for recording the communication sound data, so that it is possible to associate a job, an apparatus and recorded sound data with each other, and separate failures of the network 5.

Still further, the recorded sound data is associated with apparatus ID information for identifying the apparatus at the communication sound data transmitting end, a job which is managed by the apparatus at the communication sound data transmitting end, and a job which is managed by the apparatus at the communication sound data receiving end, so that it is possible to compare the sound data transmitted to the communication partner and the sound data received from the communication partner, and specifically analyze the failure of the network 5.

Still further, the recorded sound data is deleted when a predetermined time elapses, so that it is possible to release a logical area of a memory after the predetermined time elapses and therefore effectively utilize the memory.

The information processing system 1 have been explained based on the embodiments in accordance with the present invention. However, it is not intended to limit the present invention to the precise form described, and obviously many modifications and variations are possible without departing from the spirit and scope of the invention.

For example, while recording is started in step S35 in the above example, the present invention is not limited thereto, but recording can be started in step S32 with an off-hook as a trigger.

Also, while a sound recording start command is issued before transmitting a calling tone after off-hook in the above example, the present invention is not limited thereto. For example, a sound recording instruction is issued only when a redialing job is performed after a communication error occurs. In this case, it is possible to record only necessary communication, i.e., communication sounds which are required for analyzing repeatedly occurring errors. Also, a sound recording instruction is issued only when the frequency of occurring an error exceeds a predetermined threshold value.

Meanwhile, the series of processes as described above may be performed by hardware or software. In the case where the series of processes are performed by software, various programs of the software are installed in a computer which can realize the above functions by running the various programs, and the various programs can be installed by reading them from a recording medium or downloading them from the Internet.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing system that transmits and receives sound data through a switching equipment, comprising:
    a transmitting end image forming apparatus that has a facsimile function to transmit communication sounds through the switching equipment; and
    a receiving end image forming apparatus that has a facsimile function to receive the communication sounds through the switching equipment, wherein
    the transmitting end image forming apparatus comprises:
        a first sound recorder; and
        a first controller that generates a sound recording start command to start a recording of the communication sounds, and transmits the sound recording start command to the receiving end image forming apparatus,
    the receiving end image forming apparatus comprises:
        a second sound recorder; and
        a second controller that causes the second sound recorder to start the recording of the communication sounds when receiving the sound recording start command,
    the communication sounds indicate whether a facsimile communication error occurs between the transmitting end image forming apparatus and the receiving end image forming apparatus, and
    the transmitting end image forming apparatus or the receiving end image forming apparatus detects the facsimile communication error by comparing the communication sounds recorded by the first sound recorder with the communication sounds recorded by the second sound recorder.

2. The information processing system of claim 1 wherein:
    when the receiving end image forming apparatus receives the sound recording start command, the second controller generates a command receiving result notification, and transmits the command receiving result notification to the transmitting end image forming apparatus, and
    when the transmitting end image forming apparatus receives the command receiving result notification, the first sound recorder starts the recording of the communication sounds in the transmitting end image forming apparatus.

3. The information processing system of claim 2 wherein the command receiving result notification includes apparatus ID information identifying the receiving end image forming apparatus and job ID information identifying a job that corresponds to the recording of the communication sounds and is managed by the receiving end image forming apparatus.

4. The information processing system of claim 1 wherein the transmitting end image forming apparatus comprises:

an incoming call response monitoring module that monitors an incoming call response on a telephone line to which the switching equipment is connected, and after the incoming call response monitoring module detects the incoming call response on the telephone line to which the switching equipment is connected, the first controller transmits the sound recording start command to the receiving end image forming apparatus.

5. The information processing system of claim 4 wherein the incoming call response monitoring module monitors the incoming call response by monitoring voltage variation on the telephone line or detecting polarity inversion on the telephone line.

6. The information processing system of claim 4 wherein the switching equipment transmits and receives the communication sounds through a public switched telephone network or an IP network.

7. The information processing system of claim 6 wherein:
the switching equipment transmits and receives the communication sounds through the IP network, and
the incoming call response monitoring module monitors an incoming call response on a communication line through which the IP network and the switching equipment are connected.

8. The information processing system of claim 7 wherein the incoming call response monitoring module monitors the incoming call response by monitoring a network protocol on the communication line.

9. The information processing system of claim 1 wherein the receiving end image forming apparatus comprises:
a command analyzer that analyzes an instruction content of the sound recording start command, and
after the command analyzer analyzes the sound recording start command, the second sound recorder starts the recording of the communication sounds in the receiving end image forming apparatus.

10. The information processing system of claim 9 wherein the sound recording start command includes apparatus ID information identifying the transmitting end image forming apparatus, and job ID information corresponding to a job for recording the communication sounds.

11. The information processing system of claim 10 wherein
the job ID information identifies a job managed by the transmitting end image forming apparatus, or a job managed by the receiving end image forming apparatus.

12. The information processing system of claim 10 wherein
the command analyzer acquires the apparatus ID information and the job ID information from the sound recording start command.

13. The information processing system of claim 1 wherein the receiving end image forming apparatus comprises:
a storage that stores sound data obtained by recording the communication sounds, and
when transmission and reception of the communication sounds are completed, the recording of the communication sounds is stopped followed by storing sound data obtained by recording the communication sounds as recorded sound data.

14. The information processing system of claim 13 wherein
the second sound recorder stores the recorded sound data in the storage in association with apparatus ID information identifying the transmitting end image forming apparatus, a job that corresponds to the recording of the communication sounds and is managed by the transmitting end image forming apparatus, and a job that corresponds to the recording of the communication sounds and is managed by the receiving end image forming apparatus.

15. The information processing system of claim 13 wherein the second sound recorder deletes the recorded sound data when a predetermined time elapses.

16. The information processing system of claim 1 wherein
before the transmitting end image forming apparatus transmits a calling tone for transmitting the communication sounds, the first controller transmits the sound recording start command to the receiving end image forming apparatus.

17. The information processing system of claim 1 wherein
the first controller generates the sound recording start command when frequency of occurring facsimile communication error exceeds a predetermined threshold value.

18. An image forming apparatus including a facsimile function to receive, through a switching equipment, communication sounds transmitted from a transmitting end apparatus that comprises a first sound recorder, the image forming apparatus comprising:
a second sound recorder; and
a controller that causes the second sound recorder to start a recording of the communication sounds when a sound recording start command to start the recording of the communication sounds is received from the transmitting end apparatus, wherein
the communication sounds are required for analysis of a facsimile communication error between the transmitting end apparatus and the image forming apparatus, and
the image forming apparatus detects the facsimile communication error by comparing the communication sounds recorded by the second sound recorder with the communication sounds recorded by the first sound recorder.

19. The image forming apparatus of claim 18 further comprising:
a controller that generates, when the sound recording start command is received from the transmitting end apparatus, a command receiving result notification for notifying that the sound recording start command has been received, and transmits the command receiving result notification to the transmitting end apparatus.

20. An image forming apparatus including a facsimile function to transmit communication sounds through a switching equipment to a receiving end apparatus that receives the communication sounds and comprises a first sound recorder, the image forming apparatus comprising:
a controller that generates a sound recording start command to start a recording of the communication sounds, and transmits the sound recording start command to the receiving end apparatus; and
a second sound recorder that starts the recording of the communication sounds after receiving, from the receiving end apparatus, a command receiving result notification for notifying that the sound recording start command has been received, wherein
the communication sounds are required for analysis of a facsimile communication error between the image forming apparatus and the receiving end apparatus, and
the image forming apparatus detects the facsimile communication error by comparing the communication sounds recorded by the second sound recorder with the communication sounds recorded by the first sound recorder.

\* \* \* \* \*